United States Patent
Guerin et al.

(10) Patent No.: US 6,377,546 B1
(45) Date of Patent: Apr. 23, 2002

(54) RATE GUARANTEES THROUGH BUFFER MANAGEMENT

(75) Inventors: Roch Andre Guerin, Yorktown Heights; Sanjay Damodar Kamat, Ossining; Ping P. Pan, Yorktown Heights; Vinod Gerard John Peris, Chappaqua; Rajendran Rajan, Bronx, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/076,266

(22) Filed: May 12, 1998

(51) Int. Cl.[7] .............................. H04L 12/56; H04J 3/14
(52) U.S. Cl. ....................................... 370/230; 370/462
(58) Field of Search ................................ 370/230, 231, 370/232, 235, 412, 413, 415, 428, 429, 462, 468, 537, 538; 709/225, 226

(56) References Cited

U.S. PATENT DOCUMENTS

| | | | | |
|---|---|---|---|---|
| 6,034,945 A | * | 3/2000 | Hughes et al. | 370/230 |
| 6,047,000 A | * | 4/2000 | Tsang et al. | 370/412 |
| 6,112,253 A | * | 9/2000 | Jones | 370/235 |
| 6,170,022 B1 | * | 1/2001 | Linville et al. | 710/29 |
| 6,240,066 B1 | * | 5/2001 | Nagarajan et al. | 370/230 |

FOREIGN PATENT DOCUMENTS

| | | |
|---|---|---|
| EP | 0 612 173 A1 | 8/1994 |
| GB | 2 321 820 A | 8/1998 |
| WO | WO 97-03549 | 2/1997 |

* cited by examiner

Primary Examiner—Min Jung
(74) Attorney, Agent, or Firm—Scully, Scott, Murphy & Presser; Louis Herzberg (57) ABSTRACT

A method of providing a rate guarantee to individual or groups of flows in a router through intelligent management of buffers. Rate guarantees are provided by intelligently allocating and isolating the buffers available to each flow. In its most basic form, the method applies to output queued network devices with a simple FIFO scheduler, where a number of streams some with rate reservations are sought to be multiplexed onto an outgoing link. The method involves strictly partitioning the buffer into portions strictly reserved for each flow in proportion to its link reservation. This ensures that each stream obtains the link reservation rate in a scalable manner. A particular embodiment of the invention allow for a portion of the buffer to be strictly partitioned while allowing streams full access to the remainder of the buffer. Other embodiments utilize the use of a link scheduler to divide bandwidth amongst a number of queues, while using buffer management to facilitate bandwidth amongst a number of flows in each queue.

52 Claims, 10 Drawing Sheets

```
void PacketProcess(Packet pkt)
{
    Boolean     accept = False;
    n = pkt.Streamid = ClassifyPkt(pkt);
    if (TotalBuf + Length(pkt) <= TotalBaf) {
        if (Buffer[n] + Length(pkt) ,= AllocBuf[n]) {
            accept = True;
            pkt.Shared = False;
        }
        else if ( SharedBuf - Length(pkt) > 0) {
            accept = True;
          pkt.Shared = True;
            SharedBuf = SharedBuf - Length(pkt);
        }
     }
     if ( accept )  {
         TotalBuf = TotalBuf+ Length(pkt);
         Buffer[n] = Buffer[n] + Length(pkt);
         /* enqueue the packet into the buffer */
     }
     else {
         /* drop the packet */
     }
   }
```

```
void PacketTransmit(Packet pkt)
{
    n = pkt.Streamid;
    TotalBuf = TotalBuf - Length(pkt);
    Buffer[n] = Buffer[n] - Length(pkt);
    if ( pkt.Shared_ )  {
        ShareBuf = SharedBuf + Length(pkt);
    }
    /* transmit the packet on the link */
}
```

RATE GUARANTEES THROUGH BUFFER MANAGEMENT

BACKGROUND OF THE INVENTION

1. Field of the Invention

This invention relates generally to packet data transmission systems and, more particularly, to packet data transmission systems which provide a quality of service to individual or a group of flows in a router.

2. Description of the Related Art

Many applications inherently require the network to provide them with a steady stream of packets in order to work correctly. Some typical examples are those involving audio or video playback like video conferencing or video-on-demand applications. Most of these applications perform very poorly if the network does not provide them with a certain minimum amount of bandwidth on an end-to-end basis. Furthermore, several video and audio coders can vary their rate of coding based on the bandwidth that is made available to them. Thus, an a-priori knowledge of the bandwidth that the network can provide is useful for these applications to select the appropriate parameters for the coding process. If the network can provide minimum rate guarantee to a flow, then this rate can be used by the sender to appropriately deliver packets to the network so that the receiver gets a continuous stream of packets. The net result is a smooth and timely playback operation at the receiver.

There are many other applications where the provision of an end-to-end rate guarantee might be most useful. In a Virtual Private Network these rate guarantees may be used to dimension the size and number of virtual links that need to be setup. Other situations might use the rate guarantee as a means to obtaining a certain level of service from the network. For example in a World Wide Web environment a higher rate guarantee directly translates into a shorter time for downloading web pages.

Provision of service guarantees, especially rate guarantees, is becoming increasingly important in packet networks, and in particular the Internet. This is caused by both the heterogeneity of requirements from new applications, and the growing commercialization of the Internet. Support for such service guarantees requires that the network control the amount of resources that each flow or set of flows is allowed to consume. The network resources whose consumption is to be controlled, consist primarily of buffers and link bandwidth, with buffer management and scheduling being the associated mechanisms.

Figure 1:
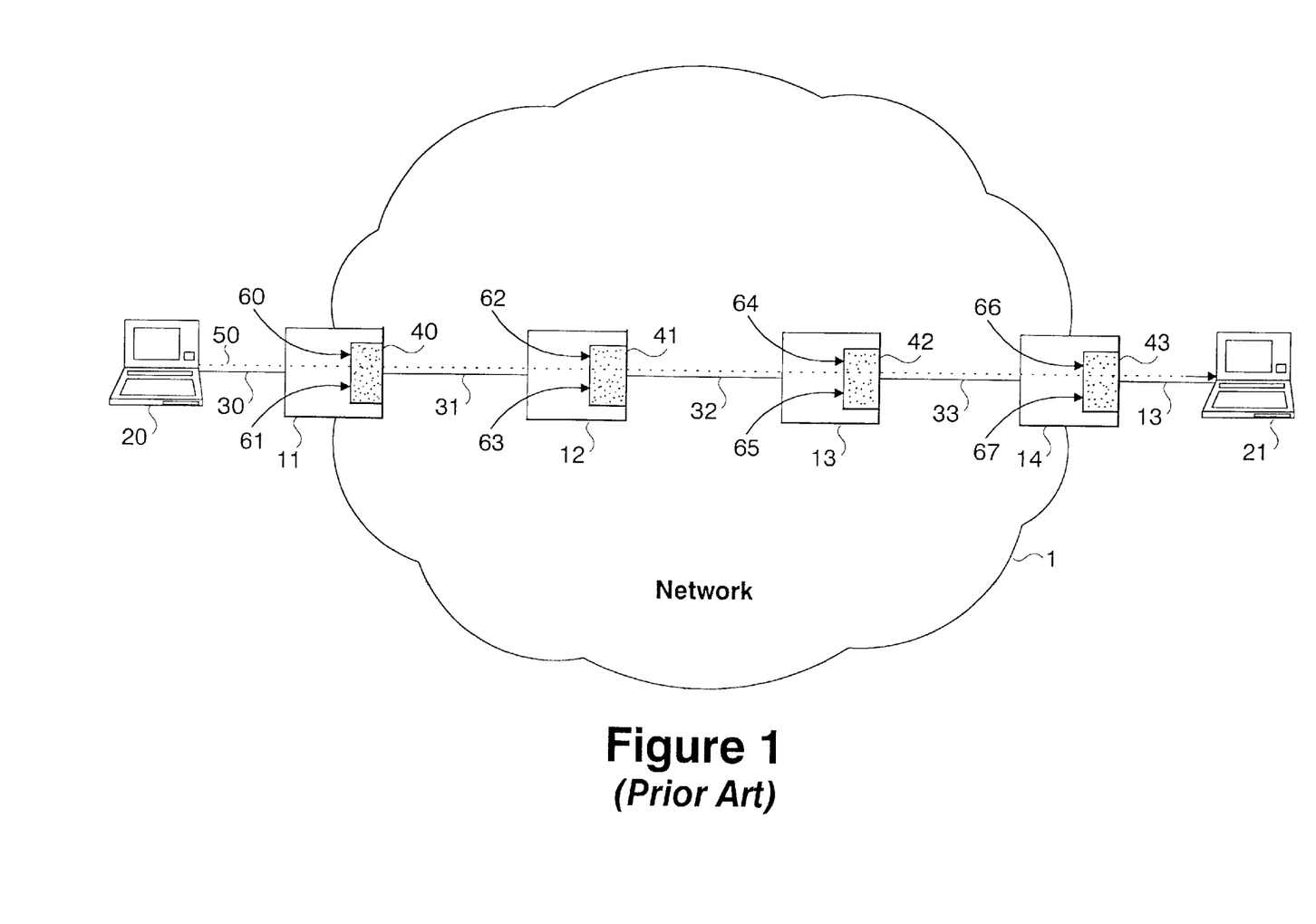
FIG. 1 illustrates the path of a flow across a network, and identifies where and what resources need to be controlled, in order to provide service guarantees to the flow.

FIG.1 is a prior art illustration of a scenario where a flow 50 (or set of flows) between sender 20 and receiver 21 is to be guaranteed a given level of service as it crosses network 1. As they cross network 1, packets originating from sender 20 traverse links 30 to 34 and network elements, e.g., switches or routers, 11 to 14. Resources that need to be controlled in this example are the bandwidth on links 30 to 34 and the buffer space in network elements 11 to 14. This control is effected by controllers 40 to 43, where each controller is responsible for ensuring that packets from flow 50 have access to sufficient buffers and bandwidth at the corresponding network element and link, respectively. For example, controller 41 is responsible for guaranteeing to flow 50 buffers in network element 13 and bandwidth on link 33, despite the presence of interfering traffic from flows 64 and 65 which are contending for the same resources.

There is a cost associated with implementing such resource controllers. They are required to perform a number of processing steps for each packet received, in order to determine the appropriate actions to take on the packet and enforce the desired service guarantees. The cost is a function of the number and complexity of these per packet processing steps, which usually grow with the accuracy and efficiency of the service guarantees to be provided. As a result, it is desirable to identify mechanisms, that can be used to implement resource controllers at the minimum possible cost for a given level of performance in providing service guarantees. In particular, this means devising solutions that can scale with increasing link speeds.

In that context, it is important to understand the generic cost components of resource control. As mentioned earlier, there are two types of resource control mechanisms, buffer management and scheduling, which are responsible for controlling access to buffer and link bandwidth, respectively. Of the two, it turns out that packet scheduling costs are typically greater than those associated with buffer management.

This is because buffer management only involves the decision at the time of a packet arrival of whether to admit or drop it and this decision can be made based on a fixed amount of "state" information. Specifically, the information used in making buffer management decision typically consists of global state information, such as the total buffer content, and flow specific state information, such as the current number of packets for the flow. There are many examples of existing buffer management mechanisms that correspond to this model. Some of the more popular ones include threshold based mechanisms [I. Cidon, R. Guérin, and A. Khamisy. Protective buffer management policies. IEEE/ACM Trans. Networking, 2(3):240–246, June 199], schemes such as Early Packet Discard (EPD) [A. Romanow and S. Floyd. Dynamics of TCP traffic over ATM networks. IEEE J. Sel. Areas Commun., (13(4):633–641. May 1995, J. Turner. Maintaining high throughput during overload in ATM switches. In Proceedings of INFOCOM, pages 287–295, San Francisco, Calif., April 1996], Random Early Discard (RED) [S. Floyd and V. Jacobson. Random early detection gateways for congestion avoidance. IEEE/ACM Trans. Networking, 1(4):397–413, August 1993], and Fair RED (FRED) [D. Lin and R. Morris. Dynamics of random early detection. In Proceedings of SIGCOMM, pages 127–137, Sophia Antipolis, France, September 1997].

Scheduling decisions, on the other hand, require both flow specific state information, such as when the last packet of a flow was transmitted and the rate or delay guarantee for the flow, and operations involving all the flows currently contending for access to the link. The latter is typically in the form of insertion and deletion operations in a sorted list of packets waiting for transmission. For example in the case of algorithms such as Weighted Fair Queuing (WFQ) [A. K. J. Parekh. A Generalized Processor Sharing Approach to Flow Control in Integrated Services Networks. PhD thesis, Laboratory for Information and Decision Systems, Massachusetts Institute of Technology, Cambridge, Mass. 02139, February 1992. No. LIDS-TH-2089] or rate controlled Earliest Deadline First (EDF) [L. Georgiadis, R. Guérin, V. Peris, and K. N. Sivarajan. Efficient network QoS provisioning based on per node traffic shaping. IEEE/ACM Trans. Networking, 4(4):482–501, August 1996], the sorted list consists of maximum departure times for packets from each active flow, where the maximum departure time for a flow is computed so as to ensure specific rate and/or delay guarantees.

Figure 2:
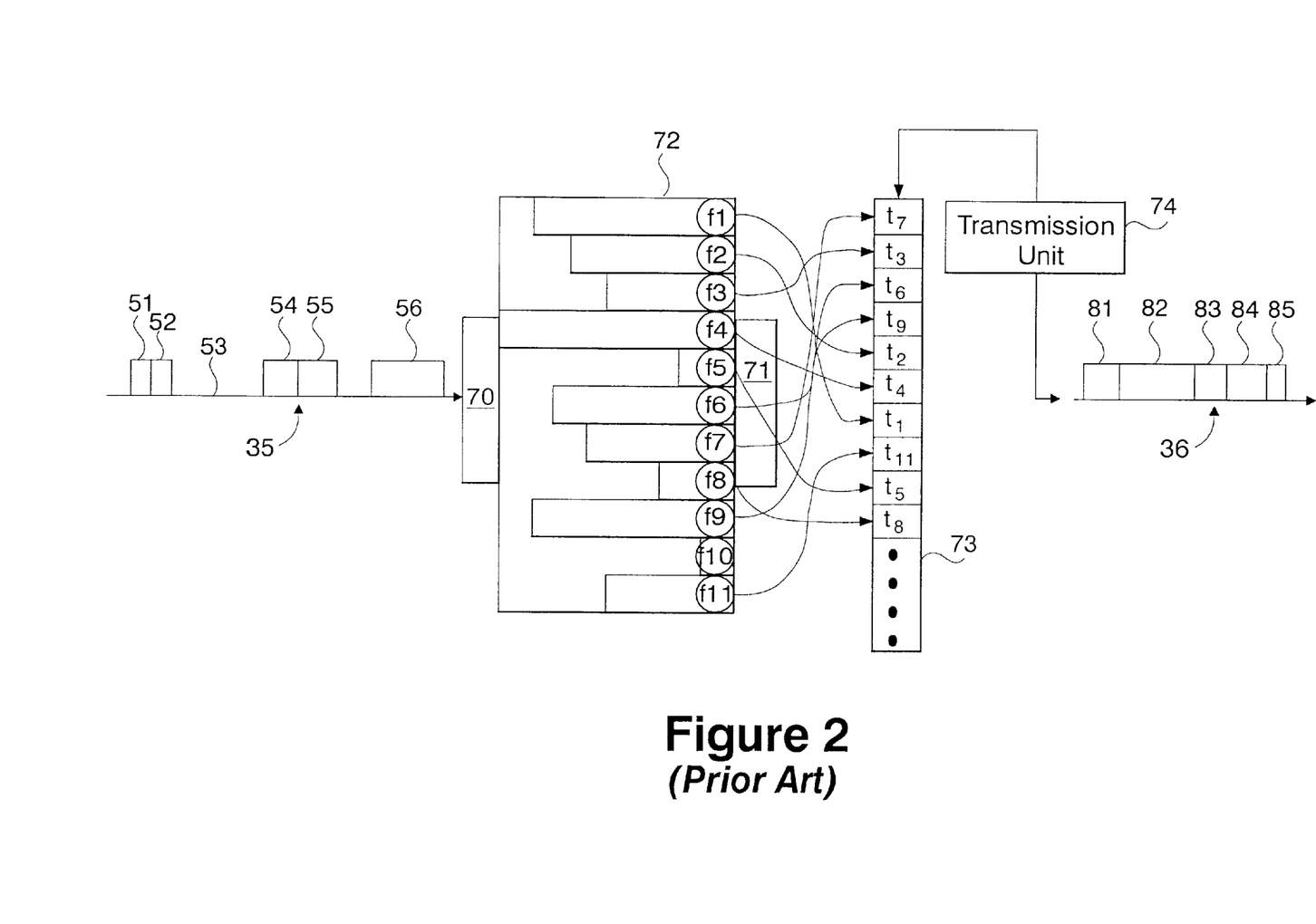
FIG. 2 illustrates the operation of generic buffer management and scheduling mechanisms at a network node to control the amount of resources that can be consumed by different flows.

FIG. 2 is a prior art illustration of the operation of buffer management and scheduling mechanisms as performed by the prior art at a typical network node to control the amount of resources that can be consumed by different flows. Packets from different flows arrive on input link 35 where they are first processed by the buffer manager unit 70. This unit makes decision of whether to accept and store an incoming packet into buffer 72, based on the total number of free buffers (white space in the figure) and the current buffer occupancy of the flow to which the packet corresponds. Specifically, the figure shows packets 51, 54, and 56 from flow f1, packets 52 from flow f4, and packets 55 from flow f3, arriving to the buffer on the input link. The buffer manager unit 70 about to process incoming packet 56 from flow f1 to determine if it should be accepted in the buffer. Based on the buffer state for flow f1 shown in FIG. 2, adding packet 56 would take flow f1 above its allocated buffer space. As a result, packet 56 will be accepted into the buffer, only if flow f1 is allowed to "borrow" free buffers from some other flows, e.g., flow f10. Buffer management schemes differ in how aggressive they are in allowing active flows to borrow free buffers from other flows, and this corresponds to different trade-offs between potential efficiency and protection of rate guarantees.

Transmissions out of the buffer and onto output link 36 are controlled by the scheduler, which consists of a processing unit 71 and a sorted list of packet transmission times 73. The processing unit 71 computes for each queue associated with a flow fi, the latest time ti at which the packet at head of the queue for flow fi should be transmitted on the link. In the case of a WFQ-like scheduler, this time is based on the transmission time of the previous packet from flow fi and the rate guarantee for flow fi. For example, if flow fi just transmitted a packet of size Pi at time t, and has a rate guarantee of Ri, the processing unit 71 will compute the next transmission time for a packet from flow fi as ti=t+Pi/Ri. This transmission time ti is then inserted in the sorted list 73, between the times tk and tl such that tk<ti≦tl. Transmission unit 74, then selects for transmission on the output link 36, the first packet from the flow fj whose transmission time is at the head of the sorted list 73. For example, the figure shows that a packet from flow f7 is about to be transmitted on output link 36, and that the previously transmitted packets were packet 81 from flow f5, packet 82 from flow f1, packet 83 from flow f4, packet 84 from flow f3, and packet 85 again from flow f1.

FIG. 2 further illustrates an important cost component of packet scheduling, namely that the size of the sorting list 73 grows with the number of flows to which service guarantees need to be provided. This can be a major impediment to scalability as speed increases. As a result, it is desirable to devise approaches that eliminate this exposure, even if at the cost of some decrease in performance guarantees or increase in the cost of other system components that are less critical for scalability purposes.

One possible direction is to lower the cost of sorting by allowing some coarsening of the information to be sorted. This is the approach of [S. Suri, G. varghese, and G. Chandranmenon. Leap forward virtual clock: A new fair queuing scheme with guaranteed delay and throughput fairness. In Proceedings of INFOCOM, page 558–566, Kobe, Japan, April 1997], which achieves a reduction from log N to log N in complexity, where N is the number of flows to be sorted. While this helps decrease sensitivity to the number of flows, the dependency on this factor remains. A possible approach that eliminates this dependency altogether is that of the Rotating Priority Queue (RPQ) proposal of [D. Wrege and J. Liebeherr. A near-optimal packet scheduler for QoS networks. In Proceedings of INFOCOM, pages 577–585, Kobe, Japan, April 1997]. In the RPQ scheme, the ordering of packet transmissions, which the sorted list provides, is now provided by keeping a fixed number of queues and rotating the priority values of each queue every T time units. Transmissions are always from the highest priority queue, and incoming packets are put in the queue whose current priority corresponds to their desired transmission time. The complexity of the sorting operation is replaced by stepping through a set of queues on transmissions, and deciding on which queue to insert a packet in on arrivals. Accurate control of packet transmissions may require a relatively large number of queues, and furthermore the RPQ scheme alone does not provide for isolation between flows, i.e., excess traffic from one flow can impact the service guarantees of another flow.

A need therefore exists for a rate guarantee method which entirely avoids the necessity for a sorting operation, and therefore eliminates dependency on the number of flows in packet transmission decisions. The implementation must meet the further requirement of minimizing overall complexity, and more importantly, being able to also ensure rate guarantees to individual flows even in the presence of excess traffic from other flows. The method's complexity must also not significantly depend on the accuracy of the guarantees it provides, e.g., the increase in the number of queues of RPQ.

SUMMARY OF THE INVENTION

Therefore, it is an object of the present invention to provide a method for providing rate guarantees to individual flows (or set of flows) through the use of a novel buffer management scheme.

It is yet another object of the present invention to provide a method for providing rate guarantees to individual flows which entirely avoids the need for a sorting operation and therefore eliminate the dependency on the number of flows in packet transmission decisions while further minimizing overall complexity, even in the presence of excess traffic from other flows.

It is still yet another object of the present invention to provide a method for providing rate guarantees whose complexity does not significantly depend on the accuracy of the guarantees it provides, e.g., the increase in the number of queues of RPQ.

It is a further object of the present invention to provide a method for providing rate guarantees whereby a single link may be shared amongst multiple streams with link reservations in a manner that is fair, efficient and scalable.

It is another object of the present invention to provide a method for enabling routers (switches) to support differentiated services over and above regular packet forwarding.

It is a further object of the present invention to provide a method for allowing simple FIFO scheduling of streams merged into a single class.

It is yet another object of the present invention to implement the present method as computer readable program code contained on a computer usable medium.

Accordingly, the aforementioned objectives are achieved through the use of a novel buffer management scheme that enables rate guarantees to be provided to individual flows (or sets of flows) without requiring a sophisticated scheduler that can arbitrate between packets waiting for transmission. A flow or stream is a sequence of packets originating from an application on a source and terminating in an application on a destination. By intelligently allocating and isolating the buffer space dedicated to each flow an appropriate per-flow performance guarantee can be provided.

An individual flow may require a certain quality of service guarantee from the network. While there are many different ways in which quality of service can be guaranteed to individual flows (streams) most involve complicated scheduling policies. These policies have a complexity of O(log N) where N is the number of streams that are multiplexed at the link. The method of the present invention limits the complexity of the scheduler to a simple First In First Out (FIFO) scheduler. A FIFO scheduler has O(1) complexity and is, therefore, very simple to implement. The inherent simplicity is a driving force towards widescale use as a scheduling policy in today's routers. Despite its simplicity, one of the main drawbacks of the FIFO scheduler is it's inability to provide service differentiation to individual streams. A single flow that is sending traffic in excess of its negotiated profile can swamp the buffers and cause packets of conforming flows to be dropped. We overcome this problem by shifting the burden of service differentiation from the scheduler to the buffer management module, which intelligently decides which packets are to be accepted to be queued up for transmission. This selective admission is used to ensure that different streams can be provided with the required bandwidth guarantees. The present invention is primarily interested in a single quality of service parameter, namely the provision of rate guarantees to streams. In other words, it is a goal of the present invention to ensure that a particular stream can be guaranteed to receive a certain minimum bandwidth at the router through the allocation of a predetermined portion of a storage buffer to each stream. By intelligently allocating and isolating the buffer space available to each flow, appropriate per-flow performance guarantees are provided.

There are many benefits to providing rate guarantees by relying solely on buffer management. In general, buffer management operations typically require a constant number of per packet processing steps, which translates into low complexity and good scalability properties. In addition, it is worth noting that buffer management, and therefore its cost, is necessary even when a separate scheduling mechanism is used. This is because scheduling at best guarantees sufficient transmission opportunities to individual flows. However, those guarantees are of little benefit, if a flow has no packets waiting because another misbehaving flow is occupying the entire buffer space. Hence, buffer management is also needed if service guarantees are to be provided.

The foregoing and other objects, advantages, manner of operation and novel features of the present invention will be understood from the following detailed description when read in conjunction with the accompanying drawings and appended claims.

DESCRIPTION OF PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

OVERVIEW

The method of the present invention has applicability to any packet communication network. For the purpose of illustration, consider the most popular packet switched network of today, namely, the Internet. A source creates a packet of data which is sometimes called a datagram and injects it into the network. The Internet Protocol (IP) network consists of packet forwarders called routers that are responsible for directing the packets from their source to their ultimate destination. The routers exchange control information with their peer routers to determine a consistent way of forwarding packets.

The operations performed in a router can be divided into two distinct categories based on whether they are in the control path or the data path. The control path is used to provide control information to the router so that it can allocate resources for a flow or a group of flows which is generically referred to as a stream. A stream is the basic unit for which resources are allocated in the router and is identified during the setup phase, otherwise referred to as admission control. The process of admission control is performed as part of a setup procedure performed by the router and involves a setup protocol that analyzes reservation requests as they occur from a plurality of packet streams. The admission control algorithm decides to accept or reject a stream based on whether there is sufficient buffer space available to be allocated to that stream. This stream setup may be achieved by way of configuration or some explicit reservation protocol like the Resource Reservation Protocol (RSVP) [R. Braden, et. al. Resource ReSerVation Protocol (RSVP)—version 1, functional specification. Request for Comments (Proposed Standard) RFC 2205, Internet Engineering Task Force, September 1997 and is part of the control path.

The net result of the admission control process is that a packet stream n is guaranteed to receive at least $$\frac{AllocBuf[n]}{Sparebuf + \sum_{n=1}^{N} AllocBuf[n]} \times C \text{ bytes/sec} \qquad \text{Eq.1}$$

of bandwidth measured over a sufficiently long interval of time. This interval of time is bounded above by TotalBuf/C sec.

Where the terms of equation 1 include;

AllocBuf[n]: denotes the maximum number of bytes from the buffer that can be allocated to stream n. This byte allocation figure is determined at the time the stream is setup (admission control stage) and is a function of the rate R in bytes/sec that needs to be guaranteed to stream n.

Sparebuf: denotes the maximum leftover buffer space after all streams have been allocated, where $$Sparebuf = TotalBuf - \sum_{n=1}^{N} AllocBuf[n]$$

TotalBuf: is a constant that denotes the maximum buffer size at the output link measured in bytes.

Note that buffer space is measured in bytes, since packets can be of different sizes, and the transmission time of the packet is proportional to the size of the packet.

Using equation 1 it is possible to devise an admission control strategy that provides rate guarantees to packet streams once they are admitted. That is, by intelligently allocating and isolating the buffer space available to each packet stream a performance guarantee can be provided to each stream.

Figure 3:
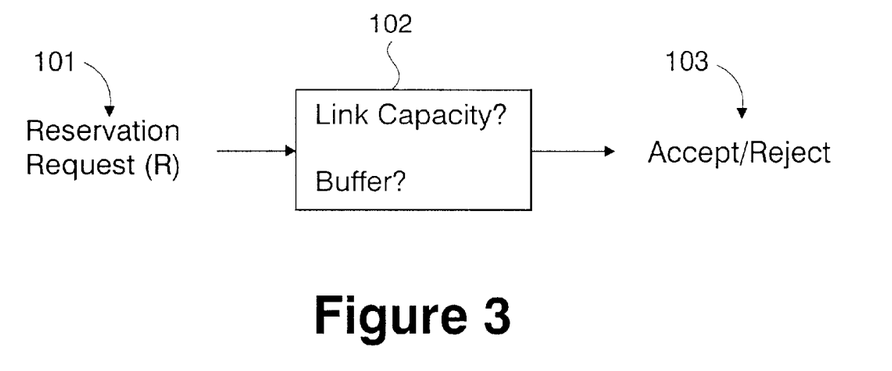
FIG. 3 illustrates the different steps involved in deciding whether to accept or reject a reservation request. These steps take place in the control plane.

FIG. 3 is a top level diagram illustrating the admission control strategy. The diagram depicts the general mechanism for processing a reservation request from a packet stream n. The setup protocol typically involves sending a Reservation Request 101 to the router 102. The router 102 then determines if it can accept the request by checking if there is sufficient link capacity as well as buffer space to satisfy the request. The router's 102 decision logic outputs a decision to either accept or reject the packet 103. Recall that the total buffer space that is available at the output is fixed and is denoted by TotalBuf. So if there are a total of N streams currently allocated and multiplexed on the output link, Totalbuf is defined by $$TotalBuf = Sparebuf + \sum_{n=1}^{N} AllocBuf[n]$$

If a new stream N+1 makes a reservation request, that is it desires a rate of R bytes/sec, it requires a buffer allocation in bytes equal to;

$$AllocBuf[N+1] = \frac{R}{C} \times TotalBuf$$

If there is sufficient buffer space to make this new allocation then it is admitted; if not it is rejected. A determination of sufficient buffer space is in accordance with the following equation;

AllocBuf[N+1]<=Sparebuf

Note that rate reservations from new streams can occur at any point in time (e.g. during the processing of packets from previously accepted streams). After the new stream (stream N+1) is accepted, in addition to updating AllocBuf[N+1]; SharedBuf and Sparebuf need to be updated as follows:

Sparebuf=Sparebuf−AllocBuf[N+1],

SharedBuf=SharedBuf−AllocBuf[N+1].

where,

SharedBuf: denotes the shared buffer space (in bytes) currently available. This variable is initialized to Sparebuf.

At the admission control stage each stream is allocated a certain portion of the total buffer space which is guaranteed to be available to the stream for the purpose of packet processing. If at any point in time a stream needs more buffer space than its initial allotment it may grab buffer space from the shared buffer space. The concept of shared buffer space can viewed from a number of perspectives including, but not limited to representation as a fixed portion of the total buffer space dedicated to satisfying streams which require more buffer space over and above their initial allotment. Alternatively, shared buffer space can also be viewed as constituting that portion of the total buffer space which is yet to be allocated to any particular stream. Regardless of the definition applied to shared buffer space it is important to note that the division of buffer memory into fixed and shared parts need not be a physical one and can be accomplished by the simple accounting procedure described herein.

Certain policies can be applied in deciding whether to grant a stream shared buffer space or not depending on the stream's current buffer utilization and the overall buffer availability. The particular policy selected should be in accordance with the particular application and its associated system constraints and objectives.

The inverse operations are performed when a packet stream reservation is terminated. Note that it may be desirable to ensure that there is some amount of shared buffers available at all times so that there are sufficient buffers to hold transient bursts.

Figure 4A:
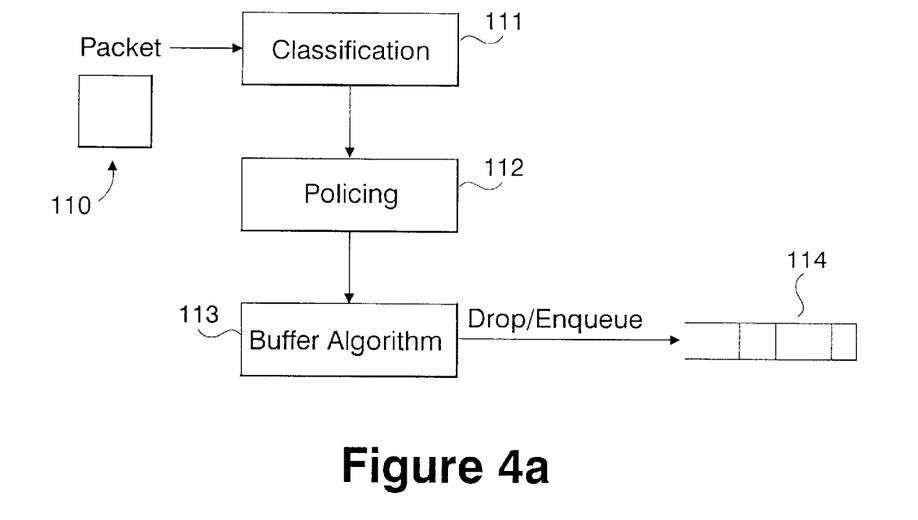
FIGS. 4a & b illustrates the different modules that are related to buffer management in the router. These steps take place in the data path and are executed for every packet that is received.
Figure 4B:
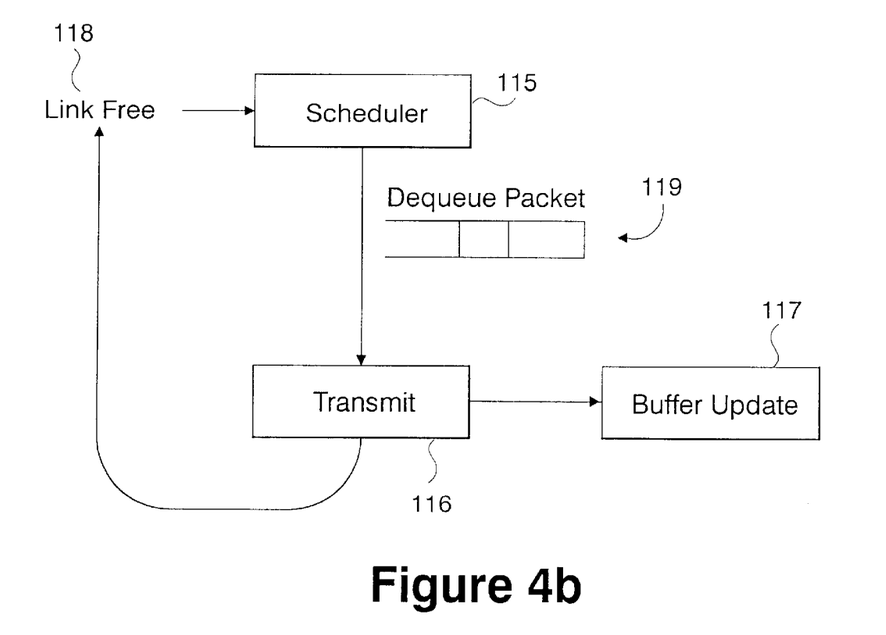

After a packet stream (e.g. granting a rate request R) is initialized in the router at the admission control stage, packet processing for the initialized stream follows. Packet processing includes a number of data path operations which define the process. The processing of a packet as soon as it is input to the router involves 4 main steps; 1) classification, 2) policing, 3) buffer management, and 4) scheduling. FIGS. 4a and 4b illustrate the aforementioned steps associated with processing each packet 110 received by the router.

FIG. 4a is a block diagram which illustrates the operations of packet classification 111, conformance testing 112, and buffer management 113. The buffer management operation 113 is the focus of the method of the present invention. As each packet is received by the router it is classified as belonging to a stream based on a subset of bits that are carried in its header and this process is referred to as Packet Classification 111. This process includes the performance of certain sanity checks to ensure that it is a bona fide IP packet. Then based on the fields in the packet header it is classified as belonging to one of a plurality of streams which is identified by a streamid. This streamid can be used as an index to retrieve information that is relevant to this stream, like the output interface through which the packet is to be forwarded, the address of the next hop router, etc.

In addition to performing packet classification 111, the incoming packet may be subjected to a conformance test 112 to determine if the stream is in-profile. If this step is implemented, the incoming packet is marked with a bit if it is "out-of-profile". A determination as to whether a packet is in-profile or not involves checking the packet against a Leaky-Bucket [J. Turner. New directions in communications (or which way to the information age?). IEEE Communications Magazine, 24(10):8–15, October 1986] type of counter to identify whether the source has sent more packets into the network than it negotiated at the time the stream was set up. Packets that are marked as out-of-profile can be preferentially discarded over unmarked packets during periods of congestion.

Subsequent to the operations of packet classification 111 and conformance testing 112 is the step of buffer management 113. At this step a decision is made as to whether there is sufficient buffer space to store the packet until it is transmitted out on the link. It is during this step that a decision to accept or reject the packet is made. The inputs to this decision process are (1) the stream identifier (streamid), (2) the amount of total free buffer space and (3) the buffer space currently occupied by all the streams. The present method decides to accept or reject each packet based on a premise of being able to provide rate guarantees to streams based on several different state variables.

FIG. 4b describes the packet processing operations which occur subsequent to buffer management 113 including scheduling 115, transmission 116 and updating of the buffer 117. The FIFO link scheduler 115 continuously picks one of the waiting packets 119 from the queue of packets accepted by the buffer manager 113 for transmission on the link 116.

The method of the present invention eliminates the drawbacks associated with a simple FIFO scheduler by using a relatively simple accounting mechanism, incorporated into the buffer management process 113, to decide which packets to accept and which to reject. This accounting mechanism involves a few simple operations at the time the packet is received as well as when a packet completes transmission on the link. The details of the accounting mechanism are described an in FIGS. 5, 6, 7 and 8.

The process step of packet transmission 116 is the last stage in the packet's movement through the router. At this stage the packet is transmitted out on the link 116. When the packet transmission has completed, the scheduler is notified of a "link free" event 118 so that it can pick up the next packet for transmission and the cycle continues.

The Buffer Management module 117 must be updated every time there is a change in the buffer occupancy. When a packet is transmitted out on the link the buffer counts have to be appropriately updated 117 to reflect the fact that the transmitted packet is no longer occupying valuable buffer resources.

ILLUSTRATIVE EMBODIMENT

The process stage of buffer management 113, illustrated in FIG. 4a, concerns buffer availability and occupancy. The buffers referenced at this stage can be physically distributed across a switch or router in several different ways. For example, a switch can have buffers at the input or output or both. Ideally, a switch should operate several times faster than the input links and should have all of its buffers at each of the outputs—the output links being the likely points of contention. This illustrative embodiment is described herein as buffer management with queuing at the output. In this embodiment the buffers where incoming packets reside are all located on the output link of a particular router or switch. Since the queuing at each of the outputs is decoupled it is possible to consider a single output link in isolation for the purposes of illustration. It is assumed that for each output link there is a single buffer memory that all the arriving packets contend for. This memory can be physically located on the output link adapter or distributed throughout the router. Consider a single output link of capacity C bytes/sec and let N denote the number of streams that are multiplexed on this link.

Figure 5A:
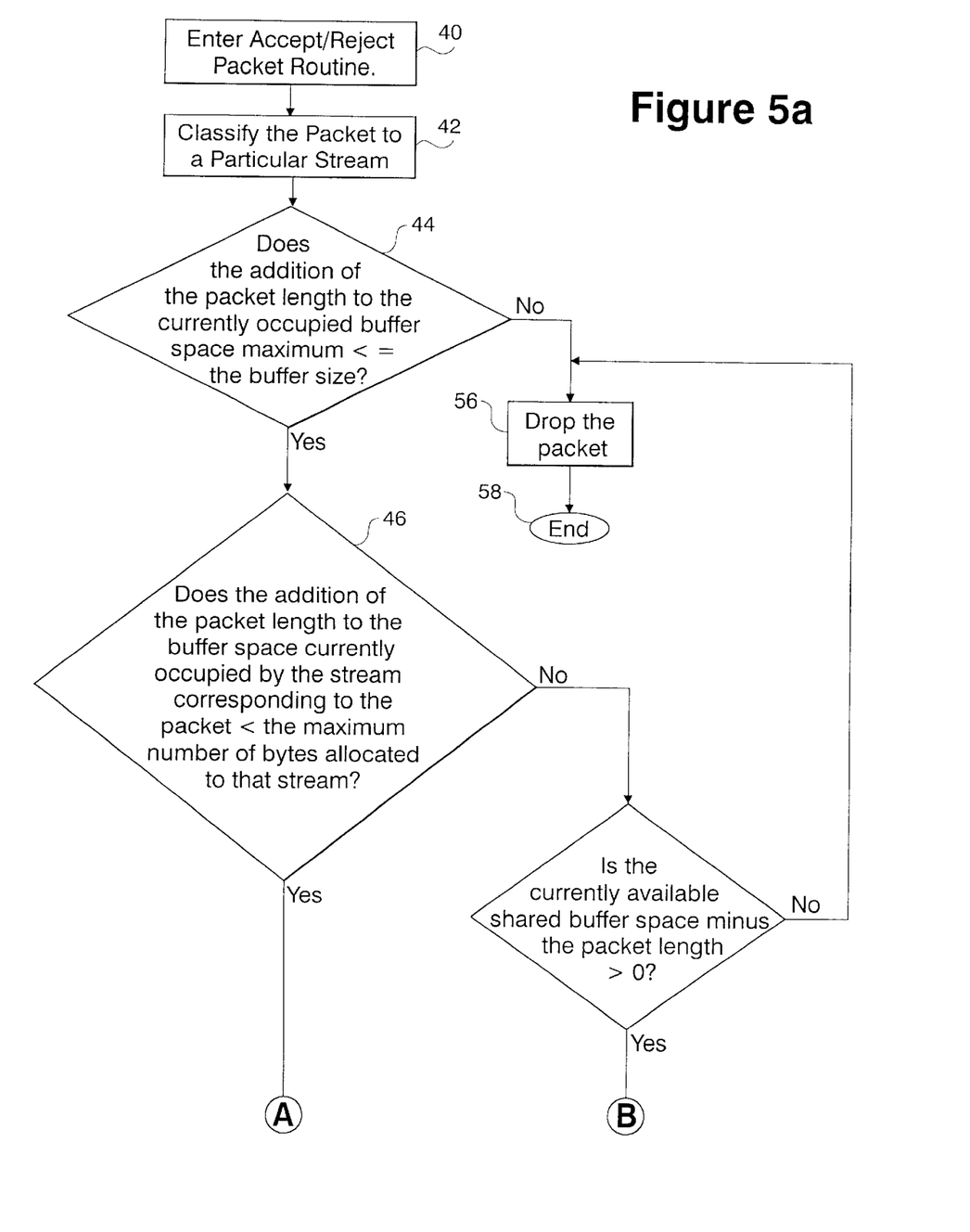
FIG. 5 is a flowchart illustrating the processing steps to determine whether to accept or reject a received packet.
Figure 5B:
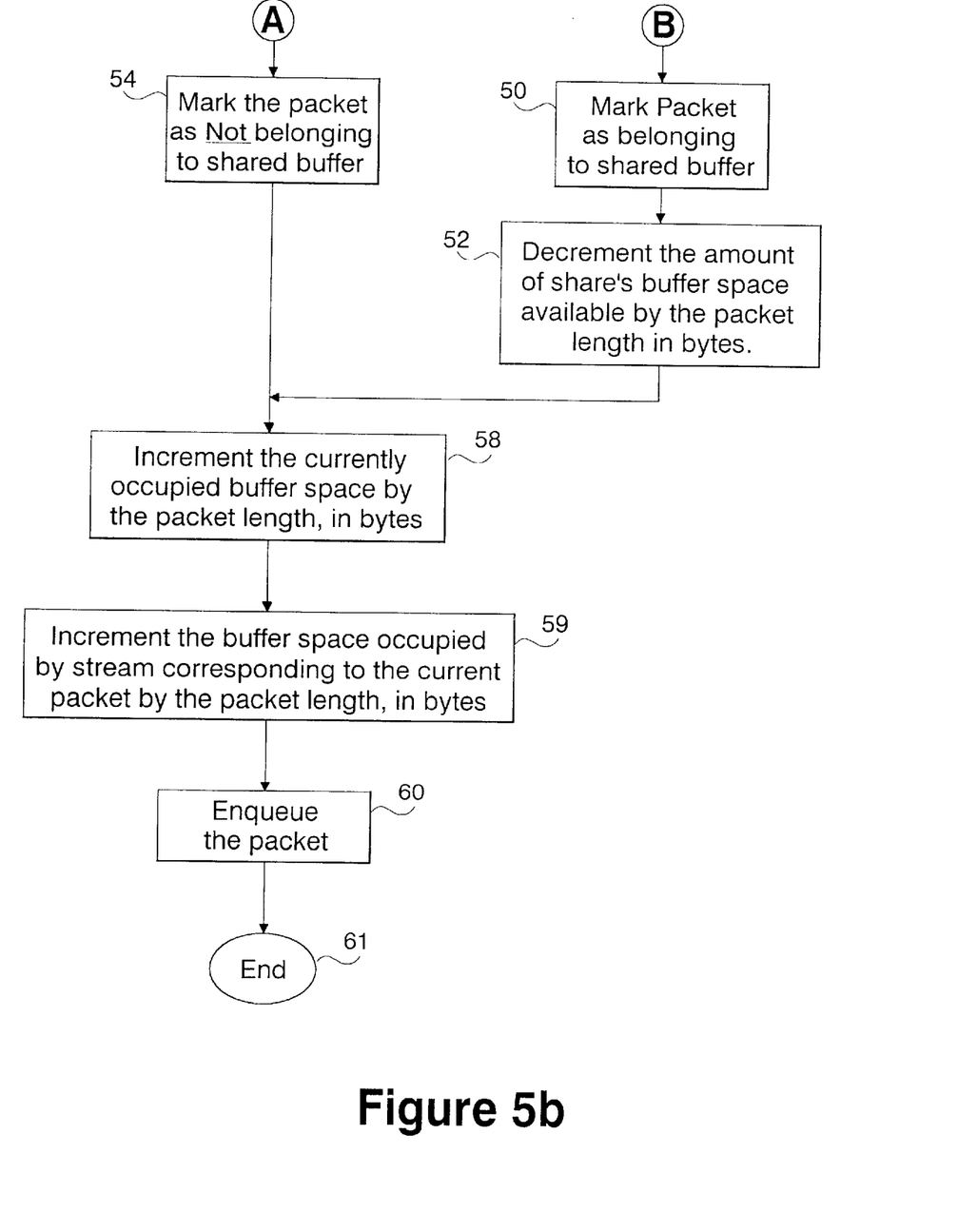
Figure 6:
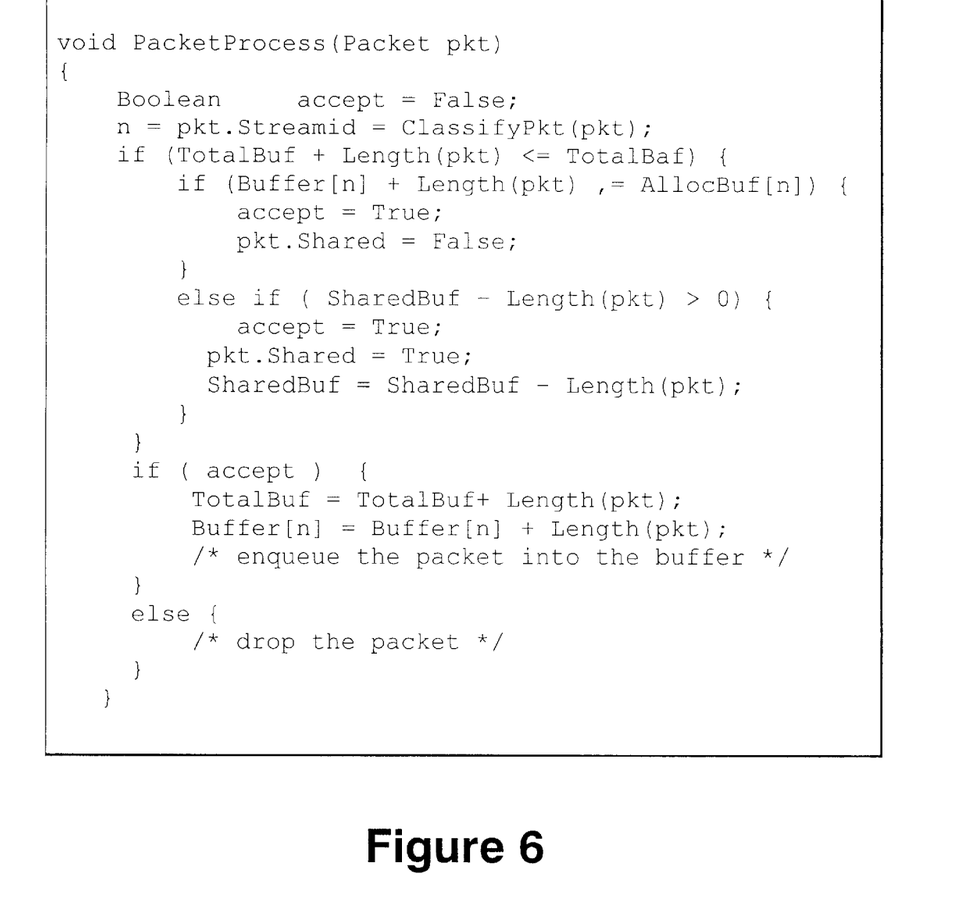
FIG. 6 is software which illustrates the processing steps to determine whether to accept or reject a received packet.
Figure 7:
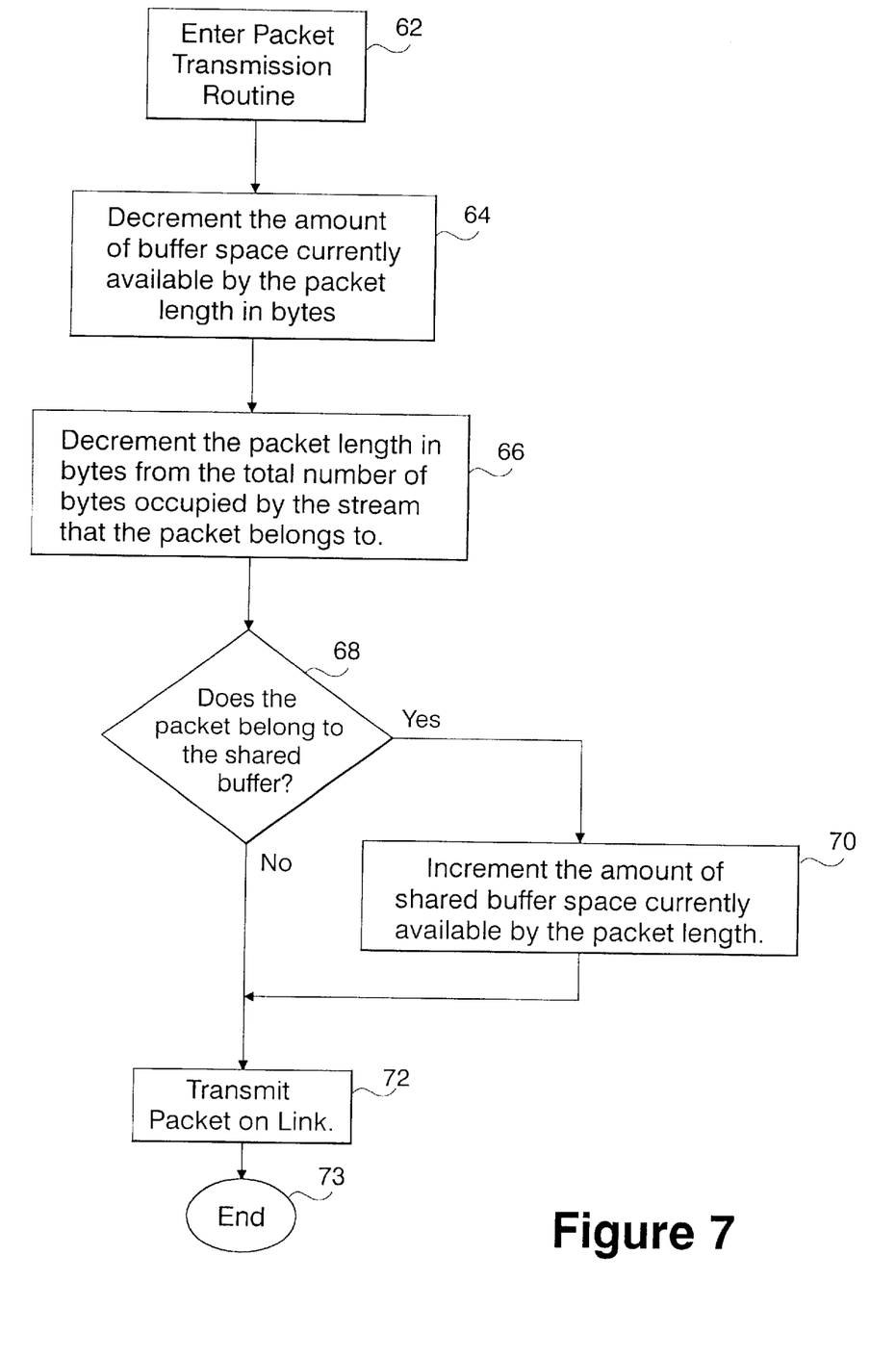
FIG. 7 is a flowchart illustrating the processing steps when a packet is transmitted onto the output link.

FIGS. 5 and 6 illustrate the processing that occurs at the time of receiving an arriving packet. FIGS. 6 and 7 describe this process in flowchart and program statement form respectively.

FIG. 5 is a flowchart describing the processing which occurs each time a packet is received. Step 40 represents the entry point into the packet evaluation routine which decides whether to accept or reject a currently received packet. The first operational step 42, classifies the received packet to one of a multiplicity of previously accepted (e.g. granted rate requests) packet streams n, where n is an integer in the range 1 to N. Step 44 is a decision step which determines whether the addition of the currently received packet in bytes to the buffer does not exceed a first threshold, the maximum buffer size in the illustrative embodiment. If so, the process continues at step 46, otherwise, the packet is dropped at step 56 and the process terminates at step 58. Step 46 represents a second decision step where a determination is made as to whether the addition of the packet in bytes to the predetermined portion of the buffer dedicated to stream n, associated with the packet, is less than or equal to a second threshold. In the illustrative embodiment, the second threshold represents the maximum number of bytes allocated to stream n in the buffer. If the packet addition exceeds the second threshold at step 46, process continues at step 48. Step 48 represents a third decision step to determine whether the currently received packet can be stored in the shared buffer region. If the currently available shared buffer space minus the length of the currently received packet in bytes is greater than zero, in the illustrative embodiment, the packet will be stored in the shared buffer region. At step 50 the packet will be accordingly marked as belonging to the shared buffer region as opposed to the general buffer region. Process then continues at step 52 where the amount of shared buffer space will be updated to account for the storage of the currently received packet.

If it is determined at step 46 that the currently received packet can be accommodated into the available buffer space allocated to stream n, process continues at step 54 where the packet is marked as not belonging to the shared buffer space. At this point, steps 52 and 54 converge at step 58 where the total allocated buffer space is updated to reflect the addition of the recently received packet. At step 59 the predetermined buffer space allocated to stream n is correspondingly updated to reflect the addition of the packet. At step 60 the packet is enqueued onto the output link for later transmission. The process terminates at step 61.

FIG. 7 is a flowchart which illustrates the accounting which must take place, in accordance with the method of the present invention, each time a packet is dequeued for transmission. It is assumed that a simple FIFO scheduler picks up packets from this queue for transmission on the link. Step 62 represents the entry point into the packet transmission routine. At step 64 the amount of total buffer space available is decremented by the packet length to be transmitted in bytes. At step 66, the pre-determined buffer space allocated to stream n is decremented by the packet length to be transmitted in bytes. Step 68 represents a decision step where it is determined whether the packet to be transmitted belongs to the shared buffer space. If not, the packet is transmitted onto the link at step 72, otherwise, the amount of shared buffer currently available is incremented by the packet length in bytes. The process terminates at step 73.

Figure 8:
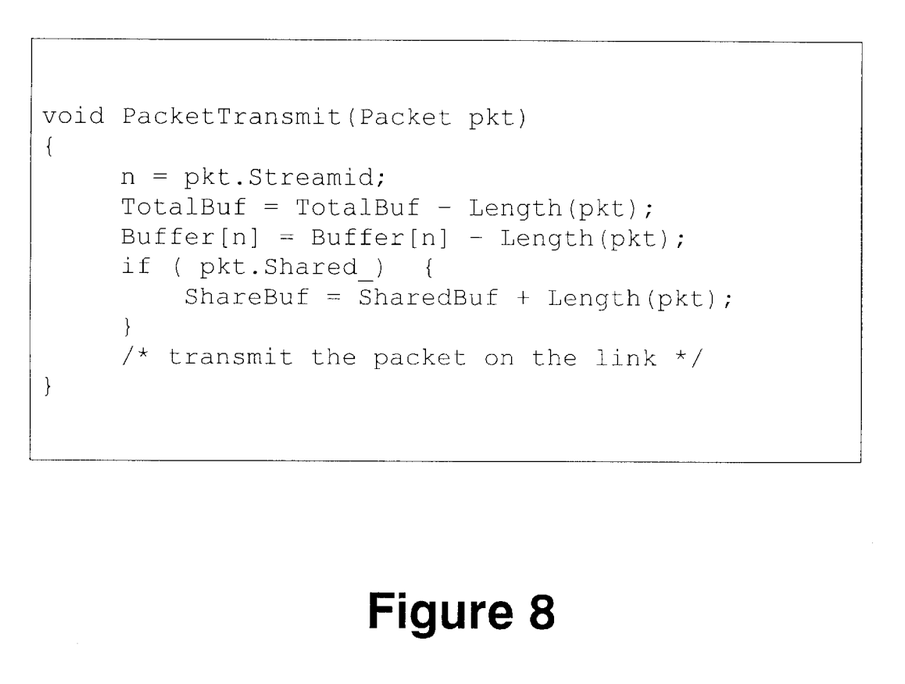
FIG. 8 is software which illustrates the processing steps when a packet is transmitted onto the output link.

FIG. 8 represents program code which illustrates the process defined by the flowchart of FIG. 7.

The general algorithm described herein including the program code described at FIGS. 6 and 8, may be implemented as readable program code stored on a program storage device and readable by a machine (e.g. processor).

MULTIPLE OUTPUT QUEUES

So far it has been assumed that there is a single FIFO queue that holds all the packets awaiting transmission on the link. While this is the simplest form of scheduling there are several other types of schedulers that have been extensively studied in the literature, [H. Zhang. Service disciplines for guaranteed performance service in packet-switching networks. *Proceedings of the IEEE*, 83(10):1374–1396 October 1995]. It is possible to apply the mechanisms described to scheduling mechanisms other than FIFO.

Figure 9:
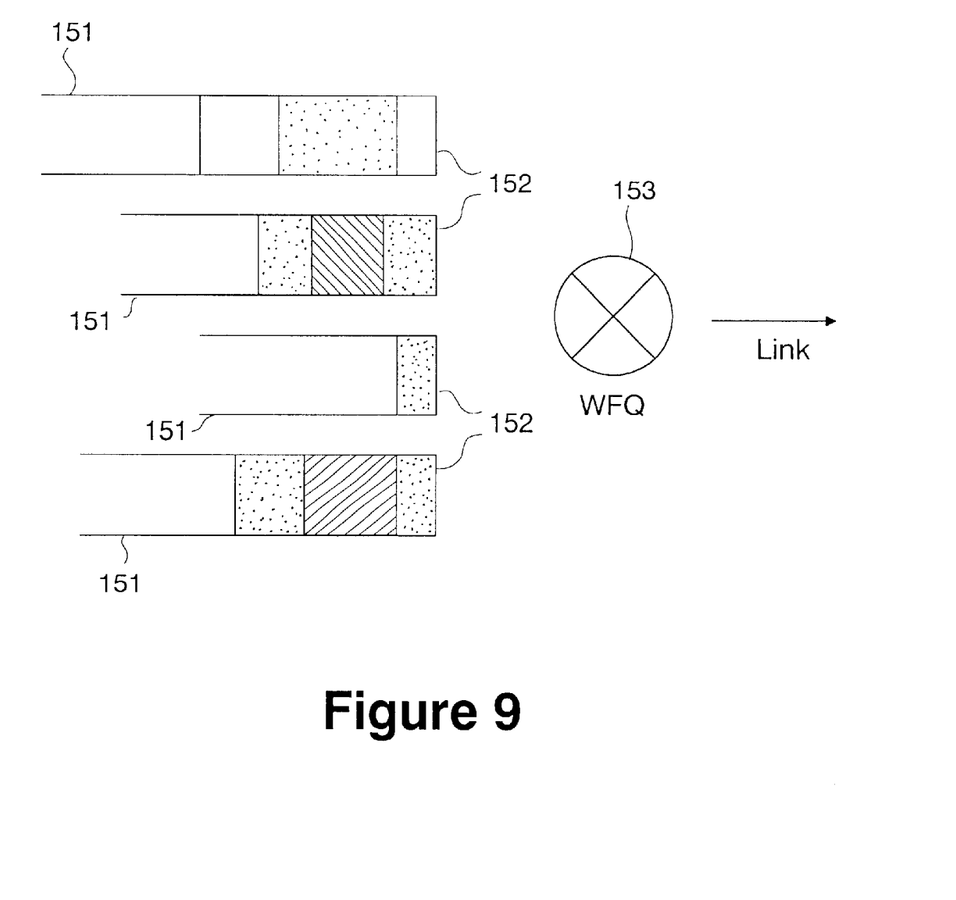
FIG. 9 illustrates a system where there are multiple queues at an output link which are arbitrated by a Weighted Fair Queuing (WFQ) scheduler.

FIG. 9 illustrates an embodiment including multiple queues at the output link with a Weighted Fair Queuing scheduler 153 arbitrating between the different queues. A description of the Weighted Fair Queuing approach can be found in [A. Demers, S. Keshav, and S. Shenker. Analysis and simulation of a fair queuing algorithm. *Journal of internetworking: Research and Experience*, 1:3–26, January 1990], and is incorporated by reference herein. In Weighted Fair Queuing each stream is placed in any one of the queues 151 based on some predetermined policy. Whenever a queue is given a transmission opportunity the packet 152 at the head of the queue is transmitted. If the buffers are statically partitioned among the different queues, the mechanisms described in this embodiment can be directly applied to provide buffer management for each of the queues.

While only particular embodiments of the invention have been shown and described herein, it will be obvious that additional modifications may be made without departing from the spirit of the invention. Still, it is not intended that this invention be limited, except as indicated by the appended claims.

Having thus described our invention, what we claim as new, and desire to secure by Letters Ppatent is:

1. A method for providing an explicit rate guarantee $R_n$ for each of a plurality of packet streams n, where each stream n is indexed in the range 1 to N and is multiplexed for transmission on a common output link j in a packet switched network, said link including a buffer having a total buffer space in bytes for storing said packets, the method comprising the steps of:
    a) for each currently received packet, identifying the packet stream, n, associated with said currently received packet;
    b) adding said currently received packet to an occupied portion of said total buffer space to yield a first sum;
    c) determining whether said first sum exceeds a first buffer threshold and setting a first variable in response hereto;
    d) adding said currently received packet to an occupied porton of said buffer space allocated to said stream n to yield a second sum;
    e) determining whether said second sum exceeds a second, stream threshold and setting a second variable in response thereto; and
    f) accepting or rejecting said packet based upon said first and second variables, whereby said rate guarantee $R_n$ for said stream n is assured.

2. The method according to claim 1, wherein said first threshold is the total buffer space.

3. The method according to claim 1, wherein said second threshold is a portion of the total buffer space allocated to packet stream n.

4. The method according to claim 1, wherein said total buffer space comprises an allocated buffer space and a shared buffer space.

5. The method according to claim 4, wherein said total buffer space has an associated total buffer counter for tracking the occupied portion of the total buffer space in bytes.

6. The method according to claim 5, further comprising adding the currently received packet to the portion of the total buffer space allocated to stream n, when the first threshold is not exceeded and the second threshold is not exceeded.

7. The method according to claim 6, further comprising incrementing said total buffer counter by the length of the currently received packet in bytes whenever said currently received packet is accepted.

8. The method according to claim 6, further comprising incrementing a stream buffer counter associated with the stream to which said currently received packet belongs by the length of said currently received packet in bytes whenever said packet is accepted.

9. The method according to claim 5, further comprising deleting the currently received packet from the portion of the total buffer space allocated to stream m when a packet associated with said stream m is transmitted.

10. The method according to claim 9, further comprising decrementing the total buffer counter by the length of the currently transmitted packet in bytes.

11. The method according to claim 9, further comprising decrementing a stream buffer counter associated with the stream of the currently transmitted packet by the length of said currently transmitted packet in bytes.

12. The method according to claim 4, wherein said shared buffer space has an associated shared buffer counter, SharedBuf, for tracking the unoccupied portion of the shared buffer space in bytes.

13. The method according to claim 12, further comprising decrementing a shared buffer counter by the length of the currently received packet in bytes whenever said currently received packet is accepted into said shared buffer space.

14. The method according to claim 12, further comprising incrementing the shared buffer counter, SharedBuf, by the length of the currently transmitted packet in bytes whenever a packet is transmitted from said shared buffer space.

15. The method according to claim 4, wherein the allocated buffer space represents that portion of the total buffer space allocated to those streams n, where n=1 . . . N, for which a rate guarantee $R_n$ is assured.

16. The method according to claim 4, further comprising determining whether a currently unoccupied portion of said shared buffer space minus the length in bytes of said currently received packet is greater than or equal to a third threshold and setting a third variable in response thereto.

17. The method according to claim 16, wherein step (f) further includes accepting or rejecting said packet based upon said third variable.

18. The method according to claim 16, where said third threshold is zero.

19. The method according to claim 16, further comprising adding the currently received packet to the shared buffer space when the first threshold is not exceeded and the second threshold is exceeded and the third threshold is exceeded.

20. A method as in claim 4, where said packets are queued prior to transmission and are stored in the total buffer space.

21. The method according to claim 20, where the order of transmission of said packets on said common output link is based on a First-In-First-Out (FIFO) policy.

22. The method according to claim 1, wherein said buffer is allocated on an interface attached to said output link.

23. The method according to claim 1, wherein multiple buffers are associated with said output link, said packet switched network further comprising a scheduler to arbitrate between packets awaiting transmission from said multiple buffers.

24. A method for processing a request for a rate guarantee $R_{N+1}$ for a packet stream N+1, in a packet switched network comprising N pre-allocated packet streams, said packet streams to be multiplexed for transmission on an output link over said packet switched network, said link having a buffer for temporarily storing said packets, said buffer having a total buffer space, Totalbuf, comprised of allocated buffer space and shared buffer space, the method comprising the steps of:

a) receiving a request for said rate guarantee $R_{N+1}$ from said packet stream N+1,     b) determining whether the rate guarantee can be accommodated by the packet switched network on said output link, said determining step comprising:

i) computing a portion of the general buffer space to be allocated to said packet stream N+1 in accordance with said rate guarantee $R_{N+1}$, Allocbuf[N+1];

ii) comparing Allocbuf[N+1] with the amount of total buffer space currently unallocated, Sparebuf, and if Allocbuf[N+1] is less than Sparebuf allocating an amount of said total buffer space equal to Allocbuf[N+1] for said stream N+1, otherwise rejecting said rate request for rate guarantee $R_{N+1}$.

25. The method according to claim 24 wherein the step of allocating an amount of said total buffer space to said stream N+1 is performed in accordance with the following equation;

$$AllocBuf[N+1] = \frac{R_{N+1}}{C} \times Totalbuf$$

where C is the speed of said output link in bytes/sec on which said packets of said stream N+1 are transmitted.

26. The method according to claim 24, where the step of computing the amount of said unallocated total buffer space, Sparebuf is performed in accordance with the following equation     Sparebuf=Totalbuf−ΣAllocBuf[n].

27. The method according to claim 24 where the shared buffer space, Sparebuf is updated after accepting said request for rate guarantee for said stream N+1 according to the following equation;

Sparebuf=Sparebuf−AllocBuf[N+1].

28. The method according to claim 24 where the unallocated buffer space, SharedBuf is updated after accepting said request for rate guarantee for said stream N+1 according to the following equation;

SharedBuf=SharedBuf−Allocbuf[N+1].

29. The method according to claim 24 where Sparebuf is updated after the termination of said request for rate guarantee $R_p$ for said stream p as follows     Sparebuf=Sparebuf+AllocBuf[p]

where p is an integer in the range 1 to N+1 that represents the terminated stream.

30. The method according to claim 24 where the shared buffer space, SharedBuf is updated after terminating said request for rate guarantee $R_p$ for said stream p according to the following equation;

SharedBuf=SharedBuf+AllocBuf[p].

31. A method stored in a computer program device readable by a machine, tangibly embodying a program of instructions executable by the machine to perform method steps for providing an explict rate guarantee R for each of a plurality of packet streams n, where each stream n is indexed in the range 1 to N and is multiplexed for transmission on a common output link j in a packet switched network, said link including a buffer having a total buffer space in bytes for storing said packets, the method comprising the steps of:

a) for each currently received packet, identifying the packet stream, n, associated with said currently received packet;

b) adding said currently received packet to an occupied portion of said total buffer space to yield a first sum;

c) determining whether said first sum exceeds a first, buffer threshold and setting a first variable in response thereto;

d) adding said currently received packet to an occupied portion of said buffer space allocated to said stream n to yield a second sum;

e) determining whether said second sum exceeds a second, stream threshold and setting a second variable in response thereto; and     f) accepting or rejecting said packet based upon said fist and second variables, whereby said rate guarantee R is assured.

32. The method stored in the computer program device according to claim 31, wherein said first threshold is the total buffer space.

33. The method stored in the computer program device according to claim 31, wherein said second threshold is a portion of the total buffer space allocated to packet stream n.

34. The method stored in the computer program device according to claim 31, wherein said total buffer space comprises an allocated buffer space and a shared buffer space.

35. The method stored in the computer program device according to claim 34, wherein said total buffer space has an associated total buffer counter for tracking the occupied portion of the total buffer space in bytes.

36. The method stored in the computer program device according to claim 35, further comprising adding the currently received packet to the portion of the total buffer space allocated to stream n, when the first threshold is not exceeded and the second threshold is not exceeded.

37. The method stored in the computer program device according to claim 36, further comprising incrementing said total buffer counter by the length of the currently received packet in bytes whenever said currently received packet is accepted.

38. The method stored in the computer program device according to claim 36, further comprising incrementing a stream buffer counter associated with the stream to which said currently received packet belongs by the length of said currently received packet in bytes whenever said packet is accepted.

39. The method stored in the computer program device according to claim 35, further comprising deleting the currently received packet from the portion of the total buffer space allocated to stream m when a packet associated with said stream m is transmitted.

40. The method stored in the computer program device according to claim 39, further comprising decrementing the total buffer counter by the length of the currently transmitted packet in bytes.

41. The method stored in the computer program device according to claim 39, further comprising decrementing a stream buffer counter associated with the stream of the currently transmitted packet by the length of said currently transmitted packet in bytes.

42. The method stored in the computer program device according to claim 34, wherein said shared buffer space has an associated shared buffer counter, SharedBuf, for tracking the unoccupied portion of the shared buffer space in bytes.

43. The method stored in the computer program device according to claim 42, further comprising decrementing a shared buffer counter by the length of the currently received packet in bytes whenever said currently received packet is accepted into said shared buffer space.

44. The method stored in the computer program device according to claim 42, further comprising incrementing the shared buffer counter, SharedBuf, by the length of the currently transmitted packet in bytes whenever a packet is transmitted from said shared buffer space.

45. The method stored in the computer program device according to claim 34, wherein the allocated buffer space represents that portion of the total buffer space allocated to those streams n, where n=1 . . . N, for which a rate guarantee $R_n$ is assured.

46. The method stored in the computer program device according to claim 34, further comprising determining whether a currently unoccupied portion of said shared buffer space minus the length in bytes of said currently received packet is greater than or equal to a third threshold and setting a third variable in response thereto.

47. The method stored in the computer program device according to claim 46, wherein step (f) further includes accepting or rejecting said packet based upon said third variable.

48. The method stored in the computer program device according to claim 46, where said third threshold is zero.

49. The method stored in the computer program device according to claim 46, further comprising adding the currently received packet to the shared buffer space when the first threshold is not exceeded and the second threshold is exceeded and the third threshold is exceeded.

50. The method stored in the computer program device according to claim 34, where said packets are queued prior to transmission and are stored in the total buffer space.

51. The method stored in the computer program device according to claim 42, where the order of transmission of said packets on said common output link is based on a First-In-First-Out (FIFO) policy.

52. The method stored in the computer program device according to claim 31, wherein said buffer is allocated on an interface attached to said output link.

* * * * *